(No Model.)
L. ZINSER.
PAN LIFTER.
No. 549,950.  Patented Nov. 19, 1895.
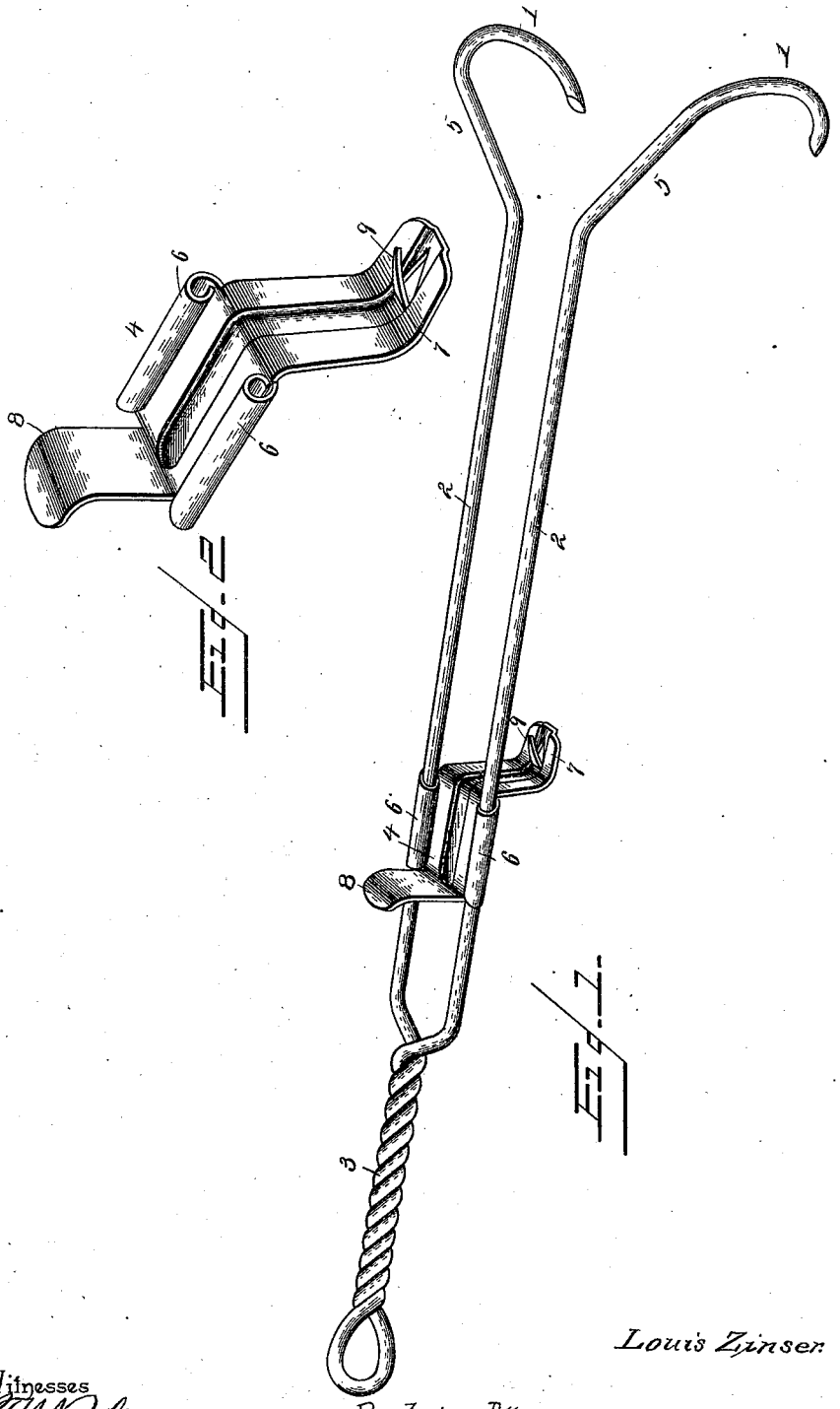
Witnesses
J. W. Riley
H. J. Riley
Inventor
Louis Zinser.
By his Attorneys,
C. A. Snow & Co.

UNITED STATES PATENT OFFICE.

LOUIS ZINSER, OF BRUNSWICK, MISSOURI.

PAN-LIFTER.

SPECIFICATION forming part of Letters Patent No. 549,950, dated November 19, 1895.

Application filed March 26, 1895. Serial No. 543,238. (No model.)

*To all whom it may concern:*

Be it known that I, LOUIS ZINSER, a citizen of the United States, residing at Brunswick, in the county of Chariton and State of Missouri, have invented a new and useful Pan-Lifter, of which the following is a specification.

The invention relates to improvements in pan-lifters.

The objects of the present invention are to improve the construction of pan-lifters and to provide a simple and inexpensive device of great strength and durability adapted to enable a pan to be readily moved about on a stove or in an oven or the like and capable of enabling a pan or shallow vessel to be readily lifted to transfer it from one place to another without the hands of the operator coming in contact with the pan or vessel.

The invention consists in the construction and novel combination and arrangement of parts hereinafter fully described, illustrated in the accompanying drawings, and pointed out in the claim hereto appended.

In the drawings, Figure 1 is a perspective view of a pan-lifter constructed in accordance with this invention. Fig. 2 is an enlarged detail perspective view of the slide.

Like numerals of reference indicate corresponding parts in both the figures of the drawings.

1 1 designate a pair of similar hooks having parallel shanks 2 and constructed of a single piece of wire twisted at the inner terminals of the shank to form a handle 3, and a slide 4, mounted on the shanks of the hooks and adapted to engage the bead or upper edge of a pan or similar shallow vessel. The outer portions of the hooks diverge at 5 and extend downward and inward and are adapted to engage under the bead or upper edge of a pan or vessel.

The slide 4 is constructed of a single piece of sheet metal rolled at its side edges to provide sleeves 6 for receiving the shanks of the hooks. The slide is provided with a depending outwardly-curved pan-engaging portion 7 at its front end and has an upward-extending thumb-piece 8 at its rear or inner end, whereby it may be readily engaged by the thumb of the operator to move the slide outward on the shanks of the hooks to engage a pan or other vessel.

The depending curved pan-engaging portion 7 is adapted to engage under the bead of a pan or other vessel and is provided with an upward-extending tongue 9, arranged to engage the bead or edge of the vessel to prevent the curved portion 7 from slipping downward on the side of the pan or vessel, and it keeps the vessel from coming in contact with the shanks of the hooks.

A pan may be readily engaged by the hooks and drawn from one portion of a stove or oven to another without the hands of the operator coming in contact with the same, and the pan-lifter may engage a pan with both the hooks and the slide to lift the pan, and in this manner it is held perfectly steady and is prevented from accidentally upsetting.

It will be seen that the pan-lifter is exceedingly simple and inexpensive in its construction, that it is durable, and that it enables a pan to be readily carried or to be moved from one portion of a stove to another.

Changes in the form, proportion, and the minor details of construction may be resorted to without departing from the principle or sacrificing any of the advantages of this invention.

What I claim is—

A pan lifter comprising a pair of hooks having parallel shanks, a handle located at the inner ends of the shanks, and an adjustable slide adapted to be moved inward and outward on the shanks and constructed of sheet metal and having its side edges rolled to form sleeves to receive the parallel portions of the shanks, and provided at its inner end with an upwardly extending thumb-piece located above the shanks in position to be engaged by the thumb of the operator in holding the device, said slide being provided at its front end with a depending L-shaped portion provided at its upper face with a projection or tongue struck up out of the sheet metal and arranged a short distance from the end of the L-shaped portion, whereby the slide is adapted to receive the bead of a pan and to engage the same at the top and bottom to enable the lifter to firmly hold a pan, substantially as described.

In testimony that I claim the foregoing as my own I have hereto affixed my signature in the presence of two witnesses.

LOUIS ZINSER.

Witnesses:
A. G. GLASER,
J. H. MORGAN.